United States Patent
Iwasaki et al.

(10) Patent No.: US 12,164,352 B2
(45) Date of Patent: Dec. 10, 2024

(54) ELECTRONIC CONTROL DEVICE AND METHOD FOR DIAGNOSING ELECTRONIC CONTROL DEVICE

(71) Applicant: Hitachi Astemo, Ltd., Hitachinaka (JP)

(72) Inventors: Mitsuhiro Iwasaki, Ibaraki (JP); Yuri Moizumi, Ibaraki (JP); Masahiro Doi, Ibaraki (JP); Takeo Yamashita, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/022,286

(22) PCT Filed: May 7, 2021

(86) PCT No.: PCT/JP2021/017537
§ 371 (c)(1),
(2) Date: Feb. 21, 2023

(87) PCT Pub. No.: WO2022/064753
PCT Pub. Date: Mar. 31, 2022

(65) Prior Publication Data
US 2023/0324971 A1    Oct. 12, 2023

(30) Foreign Application Priority Data
Sep. 25, 2020   (JP) .................................. 2020-160535

(51) Int. Cl.
*G06F 11/00*      (2006.01)
*G06F 1/28*       (2006.01)
(Continued)

(52) U.S. Cl.
CPC ................. *G06F 1/30* (2013.01); *G06F 1/28* (2013.01); *G06F 11/3058* (2013.01)

(58) Field of Classification Search
CPC ........... G06F 11/3058; G06F 1/30; G06F 1/28
(Continued)

(56) References Cited

U.S. PATENT DOCUMENTS

2006/0253718 A1   11/2006  Kawase et al.
2008/0065929 A1*   3/2008  Nadeau-Dostie .... G11C 29/802
                                                 714/E11.054
(Continued)

FOREIGN PATENT DOCUMENTS

JP    2017-149244 A    8/2017
JP    2018-25121 A     2/2018
(Continued)

OTHER PUBLICATIONS

International Search Report (PCT/ISA/210) issued in PCT Application No. PCT/JP2021/017537 dated Jul. 20, 2021 with English translation (four (4) pages).

(Continued)

*Primary Examiner* — Sarai E Butler
(74) *Attorney, Agent, or Firm* — Crowell & Moring LLP

(57) ABSTRACT

There is provided an electronic control device in which a microcomputer and a power source IC are mounted, the electronic control device having high reliability and being capable of performing fixation diagnosis of a safety control signal of the power source IC before activation of the microcomputer. The electronic control device includes a microcomputer, and a power source IC that communicates with the microcomputer. The power source IC includes a monitoring circuit that monitors the microcomputer, a safety processing circuit that outputs a safety control signal when the monitoring circuit determines an occurrence of an abnormality in the microcomputer, and a diagnosis circuit that diagnoses whether or not the safety control signal has a fixation failure. The diagnosis circuit detects whether or not (Continued)

the fixation failure has occurred, based on states of the safety control signal before and after the safety control signal is activated after activation of a power source.

15 Claims, 10 Drawing Sheets

(51) Int. Cl.
  *G06F 1/30* (2006.01)
  *G06F 11/30* (2006.01)
(58) Field of Classification Search
  USPC .......................................................... 714/1–57
  See application file for complete search history.

(56) References Cited

U.S. PATENT DOCUMENTS

| | | | | |
|---|---|---|---|---|
| 2008/0215759 | A1* | 9/2008 | Maniwa | G06F 11/1633 709/248 |
| 2010/0250099 | A1* | 9/2010 | Asakawa | F02D 41/36 701/104 |
| 2011/0173497 | A1* | 7/2011 | Nakatani | G05B 19/0428 714/E11.177 |
| 2011/0219264 | A1* | 9/2011 | Shimose | G06F 11/2025 714/25 |
| 2014/0101486 | A1* | 4/2014 | Henneberger | H04L 12/437 714/33 |
| 2014/0122942 | A1* | 5/2014 | Vilela | G06F 11/0793 714/48 |
| 2015/0035463 | A1* | 2/2015 | Kimura | F16D 63/002 318/400.21 |
| 2016/0077909 | A1* | 3/2016 | Furuya | G06F 1/3203 714/55 |
| 2016/0117210 | A1* | 4/2016 | Reichenbach | G06F 11/0787 714/37 |
| 2019/0047492 | A1 | 2/2019 | Yamanaka | |
| 2019/0266060 | A1* | 8/2019 | Jarrar | G06F 11/1641 |
| 2019/0294488 | A1 | 9/2019 | Marui et al. | |

FOREIGN PATENT DOCUMENTS

| | | |
|---|---|---|
| JP | 2018-95022 A | 6/2018 |
| JP | 2019-168835 A | 10/2019 |

OTHER PUBLICATIONS

Japanese-language Written Opinion (PCT/ISA/237) issued in PCT Application No. PCT/JP2021/017537 dated Jul. 20, 2021 (three (3) pages).
Extended European Search Report issued in European Application No. 21871888.0 dated Oct. 10, 2024 (10 pages).

\* cited by examiner

ELECTRONIC CONTROL DEVICE AND METHOD FOR DIAGNOSING ELECTRONIC CONTROL DEVICE

TECHNICAL FIELD

The present invention relates to a configuration of an electronic control device and control thereof, and particularly relates to a technique effective for application to an in-vehicle electronic control device requiring high reliability.

BACKGROUND ART

In recent years, a vehicle having a driving support function for supporting a steering operation and acceleration/deceleration, a hybrid vehicle that operates by using a motor in addition to a conventional engine, or an electric vehicle that operates only with a motor have started to spread. Such vehicles have electronic control more complicated than conventional vehicles. When a failure of an electronic component occurs, more advanced safety control is required to safely stop the vehicle.

In the electronic control devices for such vehicles, when the occurrence of a failure is detected, control for safely stopping a motor, an engine, and the like through a safety control signal is performed, and it is important to diagnose whether or not the safety control signal normally functions.

As the related art of the present technical field, for example, there is a technique such as PTL 1. PTL 1 discloses "a semiconductor device including: a control circuit that outputs a start signal of power supply; a power supply unit that starts supply of a power source voltage in response to the start signal; a timer that counts time in response to the start signal and outputs a count value; a first voltage comparator that compares a first predetermined voltage value with a voltage value supplied from the power supply unit and outputs the result as a first comparison signal; a second voltage comparator that compares a second predetermined voltage value with the voltage value supplied from the power supply unit and outputs the result as a second comparison signal; and an abnormality determination unit that detects whether or not an abnormality has occurred, based on the count value, the first comparison signal, and the second comparison signal".

CITATION LIST

Patent Literature

PTL 1: JP 2017-149244 A

SUMMARY OF INVENTION

Technical Problem

As described above, the risk of malfunction of a system is increasing with complication and enlargement of an automobile control system. When a failure occurs in a control function of an automobile control system, not only a driver and a passenger but also the entire periphery including a pedestrian is in danger. Thus, improvement of reliability of individual components constituting the system and improvement of reliability of a safety control function such as a safety control signal are important issues.

The invention disclosed in PTL 1 is effective for abnormality detection of the power source itself, but there is room for improvement in abnormality detection of output signals other than the output of the power source.

Therefore, an object of the present invention is to provide an electronic control device and a method for diagnosing the electronic control device that has high reliability and is capable of performing fixation diagnosis of a safety control signal of a power source IC before activation of a microcomputer in the electronic control device on which the microcomputer and the power source IC are mounted.

Solution to Problem

To solve the above problems, the present invention includes a microcomputer, and a power source IC that communicates with the microcomputer. The power source IC includes a monitoring circuit that monitors the microcomputer, a safety processing circuit that outputs a safety control signal when the monitoring circuit determines an occurrence of an abnormality in the microcomputer, and a diagnosis circuit that diagnoses whether or not the safety control signal has a fixation failure. The diagnosis circuit detects whether or not the fixation failure has occurred, based on states of the safety control signal before and after the safety control signal is activated after activation of a power source.

Further, according to the present invention, there is provided a method for diagnosing an electronic control device including a microcomputer and a power source IC that communicates with the microcomputer. The power source IC activates internal power sources one by one before the microcomputer is activated. After all the internal power sources are activated, the power source IC activates safety control signals one by one. The power source IC detects whether or not a fixation failure has occurred in the safety control signals based on states of the safety control signals before and after the safety control signal corresponding to the internal power source is activated after activation of a predetermined internal power source.

Advantageous Effects of Invention

According to the present invention, it is possible to realize an electronic control device and a method for diagnosing the electronic control device that has high reliability and is capable of performing fixation diagnosis of a safety control signal of a power source IC before activation of a microcomputer in the electronic control device on which the microcomputer and the power source IC are mounted.

As a result, it is possible to detect an occurrence of an abnormality in the electronic control device before a vehicle is operated, and to perform safety control in response to the abnormality.

Objects, configurations, and advantageous effects other than those described above will be clarified by the descriptions of the following embodiments.

DESCRIPTION OF EMBODIMENTS

Figure 1:
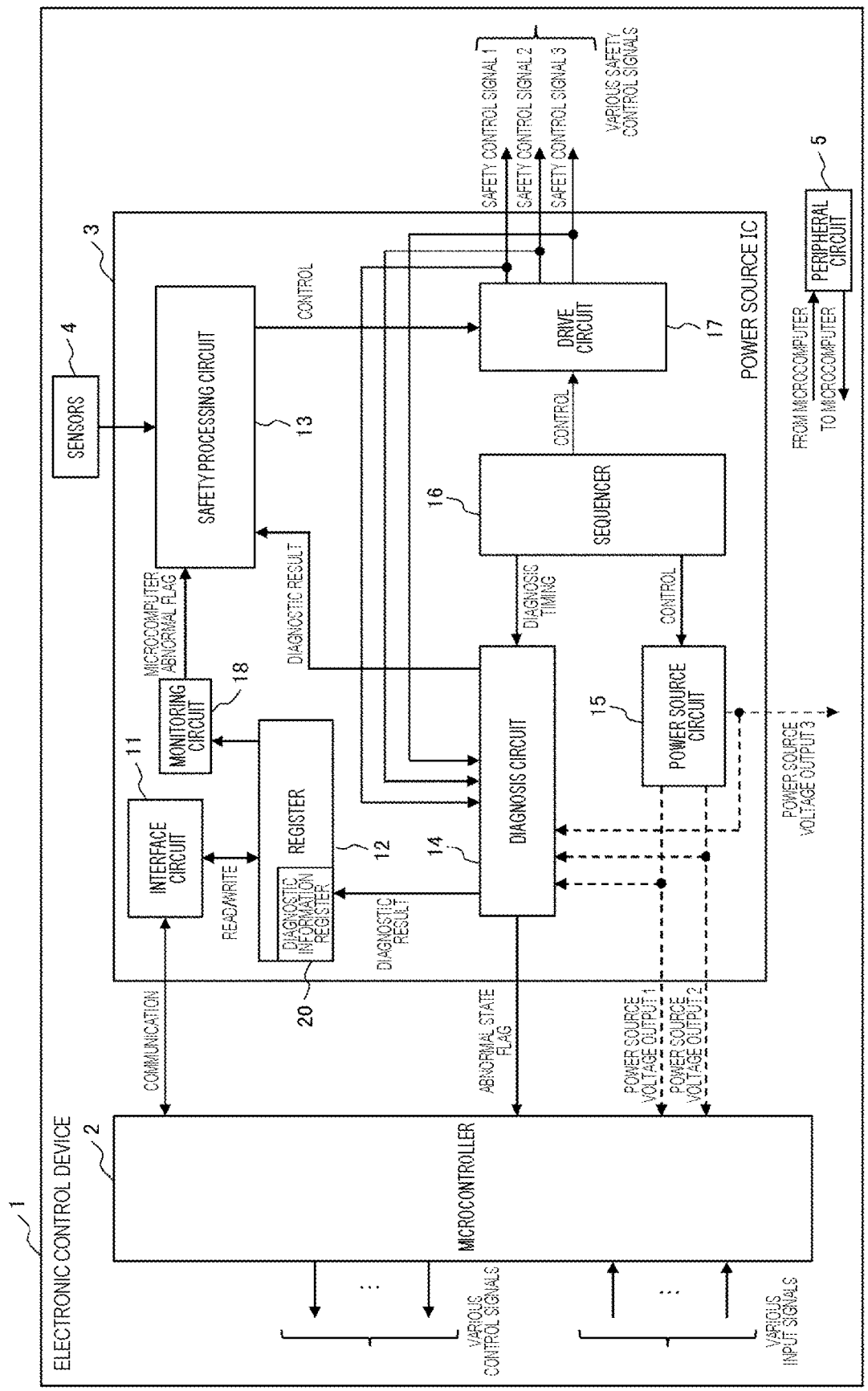
FIG. 1 is a block diagram illustrating an internal configuration of an electronic control device and a power source IC according to a first embodiment of the present invention.

Hereinafter, embodiments of the present invention will be described with reference to the drawings. In the drawings, the same components are denoted by the same reference signs, and the detailed description of the repetitive parts will be omitted.

First Embodiment

Configuration of Electronic Control Device and Power Source IC

An electronic control device and a diagnosis method thereof according to a first embodiment of the present invention will be described with reference to FIGS. 1 to 7. FIG. 1 is a block diagram illustrating an internal configuration of an electronic control device and a power source IC in the present embodiment.

As illustrated in FIG. 1, an electronic control device 1 in the present embodiment includes a microcomputer (microcontroller) 2, a power source IC 3, sensors 4, and a peripheral circuit 5.

The microcomputer 2 is the brain of the electronic control device 1, and controls the peripheral circuit 5 by using various control signals and various input signals. In addition, by communicating with the power source IC 3 through an interface circuit 11, the microcomputer can write information in the register 12, change setting of the power source IC 3, transmit the state of the microcomputer 2 itself to the power source IC 3, read the information stored in the register 12, and check the state of the power source IC 3.

The power source IC 3 generates a plurality of power source voltages from a battery voltage (not illustrated), and supplies the power source voltages of the microcomputer 2, other peripheral circuits 5, and an external sensor (not illustrated). In FIG. 1, for example, a voltage generated by the power source circuit 15 is supplied to the microcomputer 2 as a power source voltage output 1 and a power source voltage output 2. In addition, the power source voltage output 3 is supplied to the peripheral circuit 5. Although the power source voltage outputs 1 to 3 are illustrated here, the power source voltage outputs may be supplied to different destinations or in different numbers.

The power source circuit 15 and a drive circuit 17 are controlled by a sequencer 16, and the power source voltage outputs 1 to 3 and various safety control signals are activated in accordance with a determined activation sequence.

Here, the "safety control signal" is a control signal for controlling the system to be in a safe state when an abnormality has occurred inside or outside the electronic control device 1. Three signals are illustrated as the various safety control signals (safety control signals 1 to 3) in FIG. 1, but the number may be different depending on the system to which the electronic control device 1 is applied.

The power source voltage outputs 1 to 3 and the various safety control signals (safety control signals 1 to 3) are output to the outside of the power source IC 3 and are also input to the diagnosis circuit 14 to diagnose whether or not an abnormality has occurred. In addition, the diagnosis of whether or not the an abnormality has occurred is performed at a diagnostic timing designated by the sequencer 16. The diagnosis circuit 14 diagnoses whether or not the input signal is a desired output. When the abnormality has occurred, the diagnosis circuit 14 stores the diagnostic result in a diagnostic information register 20 region in the register 12, and/or outputs an abnormal state flag signal to the microcomputer 2 to report the abnormality. In addition, the information stored in the diagnostic information register 20 is reported to the microcomputer 2 by communication through the interface circuit 11. When the diagnosis circuit 14 detects the fixation failure in the safety control signal, the power source IC 3 outputs the abnormal state flag signal to the microcomputer 2 and stops the power source voltage supplied to the microcomputer 2 so as not to activate the microcomputer 2.

The monitoring circuit 18 is a circuit for the power source IC 3 to monitor the microcomputer 2. The microcomputer 2 stores the state of the microcomputer 2 in the register 12 through the interface circuit 11. The monitoring circuit 18 determines information of the microcomputer 2 stored in the register 12, and outputs, to the safety processing circuit 13, a microcomputer abnormality flag signal for a notification of whether or not the microcomputer 2 has an abnormality.

The safety processing circuit 13 is a circuit that operates when the power source IC 3 detects an abnormality. The safety processing circuit 13 operates by using, as an input, the microcomputer abnormality flag signal from the monitoring circuit 18, the diagnostic result from the diagnosis circuit 14, and information such as the temperature from the sensors 4. When a signal indicating the occurrence of the abnormality is input, the safety processing circuit 13 directly controls the drive circuit 17, and causes the system to transition to a safe state by a safety control signal in which no abnormality occurs.

Here, three types of signals have been described as the input of the safety processing circuit 13, but any one type or a combination of any two types may be used. Although temperature information have been described as the signal from the sensors 4, for example, current or voltage information other than the temperature information may be used, or information from a plurality of sensors may be used.

Activation Sequence of Power Source IC 3

Figure 2:
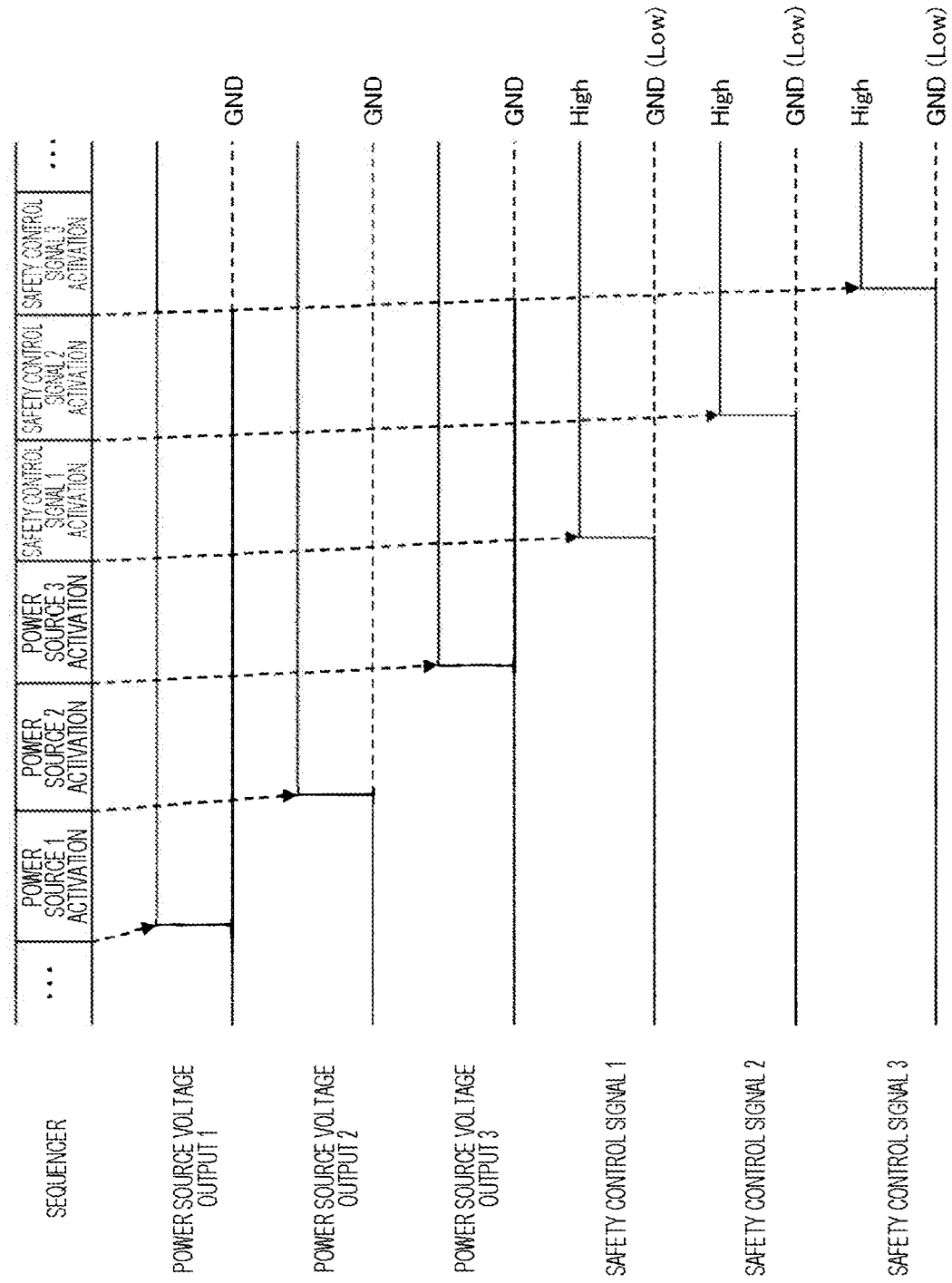
FIG. 2 is a timing chart of an activation sequence of the electronic control device illustrated in FIG. 1.

FIG. 2 is a timing chart illustrating an activation sequence of the power source IC 3 illustrated in FIG. 1. The activation of the power source IC 3 will be described with reference to FIG. 2.

The internal state of the power source IC 3 illustrated in the timing chart of FIG. 2 is determined by the sequencer 16. The power source voltage outputs 1 to 3 and the safety control signals 1 to 3 are sequentially activated as illustrated in FIG. 2 in accordance with the state changing in the order of activation of power sources 1 to 3 and activation of the safety control signals 1 to 3.

Abnormality Diagnosis of Safety Control Signal by Power Source IC 3

A method for determination an abnormality of the safety control signal by the diagnosis circuit 14 will be described.

During Normal Operation

Figure 3:
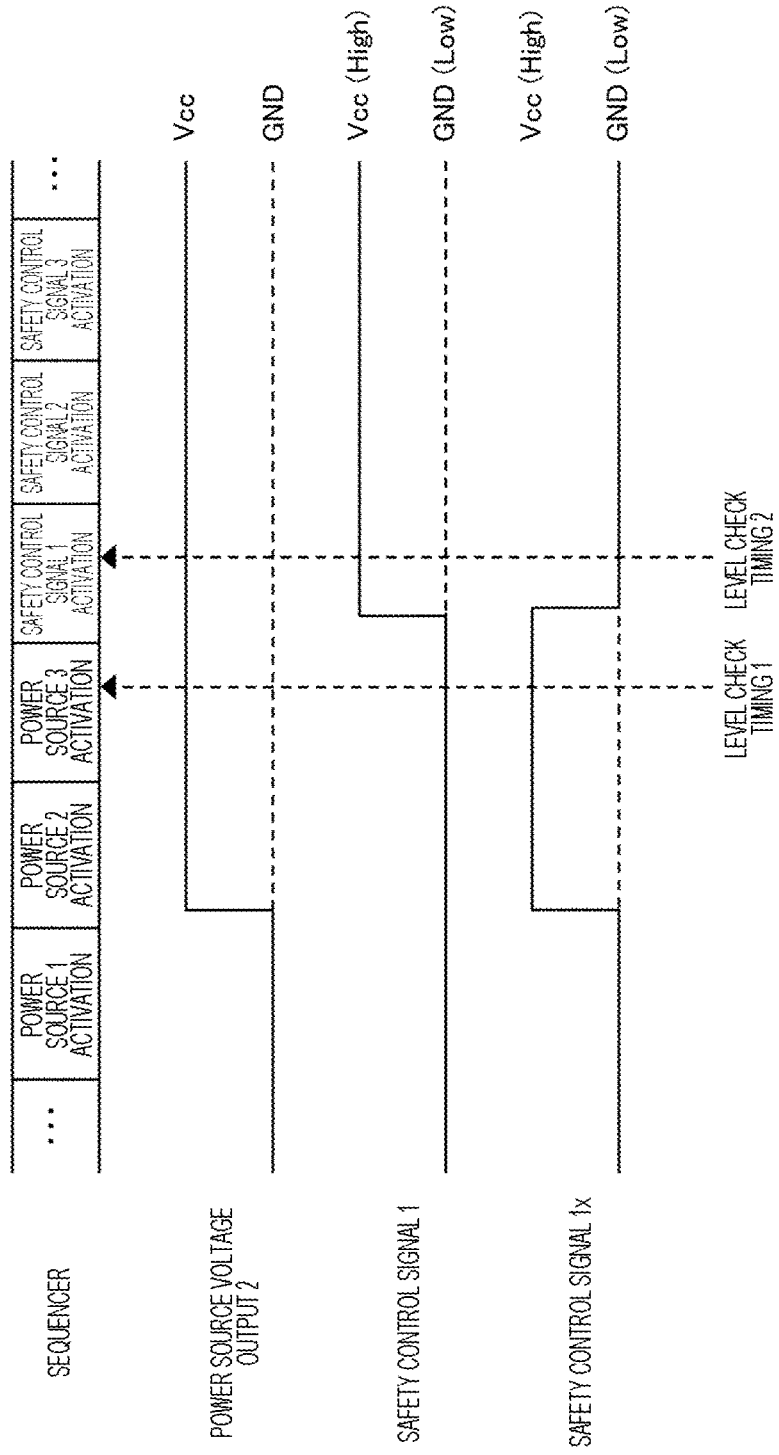
FIG. 3 is a timing chart of a safety control signal in the electronic control device illustrated in FIG. 1. (in a normal state)

FIG. 3 is a timing chart illustrating an operation example when the safety control signal output from the power source IC 3 in a normal state. Here, the level of the power source voltage output 2 after activation is set as Vcc, the High level of the safety control signal 1 is set as Vcc, and the Low level is set as GND. The safety control signal 1x illustrated in FIG. 3 is a negative logic signal, and indicates that a certain function is valid at a Low level and indicates that a certain function is invalid at a High level. The safety control signal 1x is also used to describe a case where the safety control signal is negative logic.

According to the state indicated by the sequencer (16) in FIG. 3, the power source voltage output 2 is activated in the state of activation of the power source 2. Then, in the state of activation of the safety control signal 1, the safety control signal 1 is activated to the Vcc level, and the safety control signal 1x is activated to the GND level. Here, the safety control signal 1x transitions to the Vcc level, which is the initial state of the negative logic signal, at a timing at which the power source voltage output 2 is activated.

The safety control signal is diagnosed by checking signal levels before and after the activation of the safety control signal.

In FIG. 1, the signal level before the activation is checked at a level check timing 1 that is in the state of activation of the power source 3, and the signal level after the activation is checked at a level check timing 2 that is in the state of activation of the safety control signal 1.

If the safety control signal is normally activated according to the sequencer (16), the signal level of the safety control signal 1 before activation is GND (Low level), the signal level of the safety control signal 1 after activation is Vcc (High level), the signal level of the safety control signal 1x before activation is Vcc (High level), and the signal level of the safety control signal 1x after activation is GND (Low level). That is, when the safety control signal operates normally, the diagnosis circuit 14 determines that the determination result is normal under the condition that the signal levels before and after activation are different.

In High fixation Abnormal State

Figure 4:
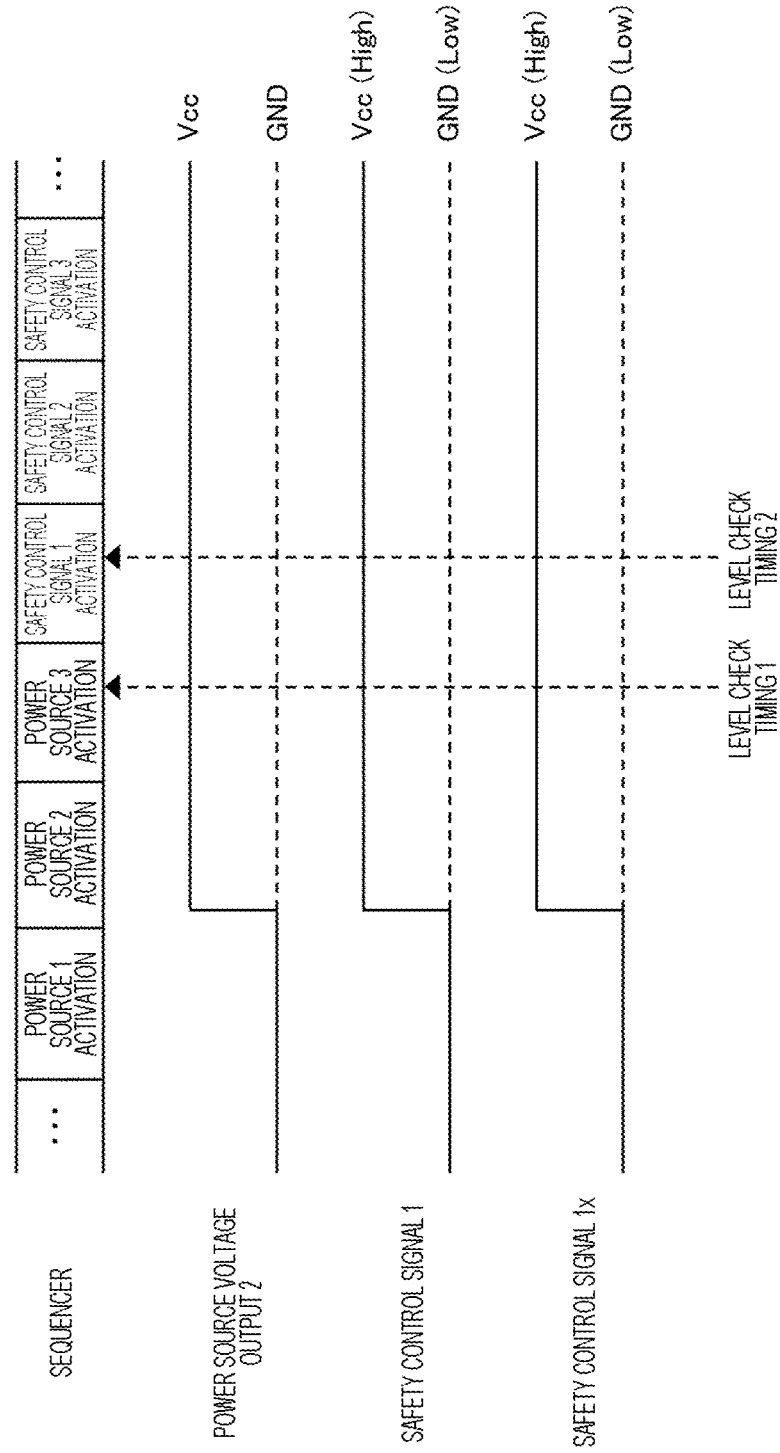
FIG. 4 is a timing chart of the safety control signal in the electronic control device illustrated in FIG. 1. (in a High fixation abnormal state)

FIG. 4 is a timing chart illustrating an operation example when the control signal output from the power source IC 3 is in a High fixation abnormal state. Here, it is assumed that the level of the safety control signal is defined similarly to FIG. 3, and the same applies to the timing of the level check of the signal.

According to the state indicated by the sequencer (16), the power source voltage output 2 is activated in the state of activation of the power source 2. Then, in the state of the activation of the safety control signal 1, the safety control signal 1 and the safety control signal 1x are activated. However, when the power source voltage output 2, and the safety control signal 1 or the safety control signal 1x are fixed, the safety control signal 1/the safety control signal 1x operates similarly to the power source voltage output 2.

Therefore, the safety control signal 1/safety control signal 1x is at the level of Vcc before the original activation timing. That is, when High fixation abnormality occurs in the safety control signal, the diagnosis circuit 14 determines the determination result to have a High fixation abnormality under the condition that both the signal levels before and after activation are Vcc (High level).

In Low fixation Abnormal State

Figure 5:
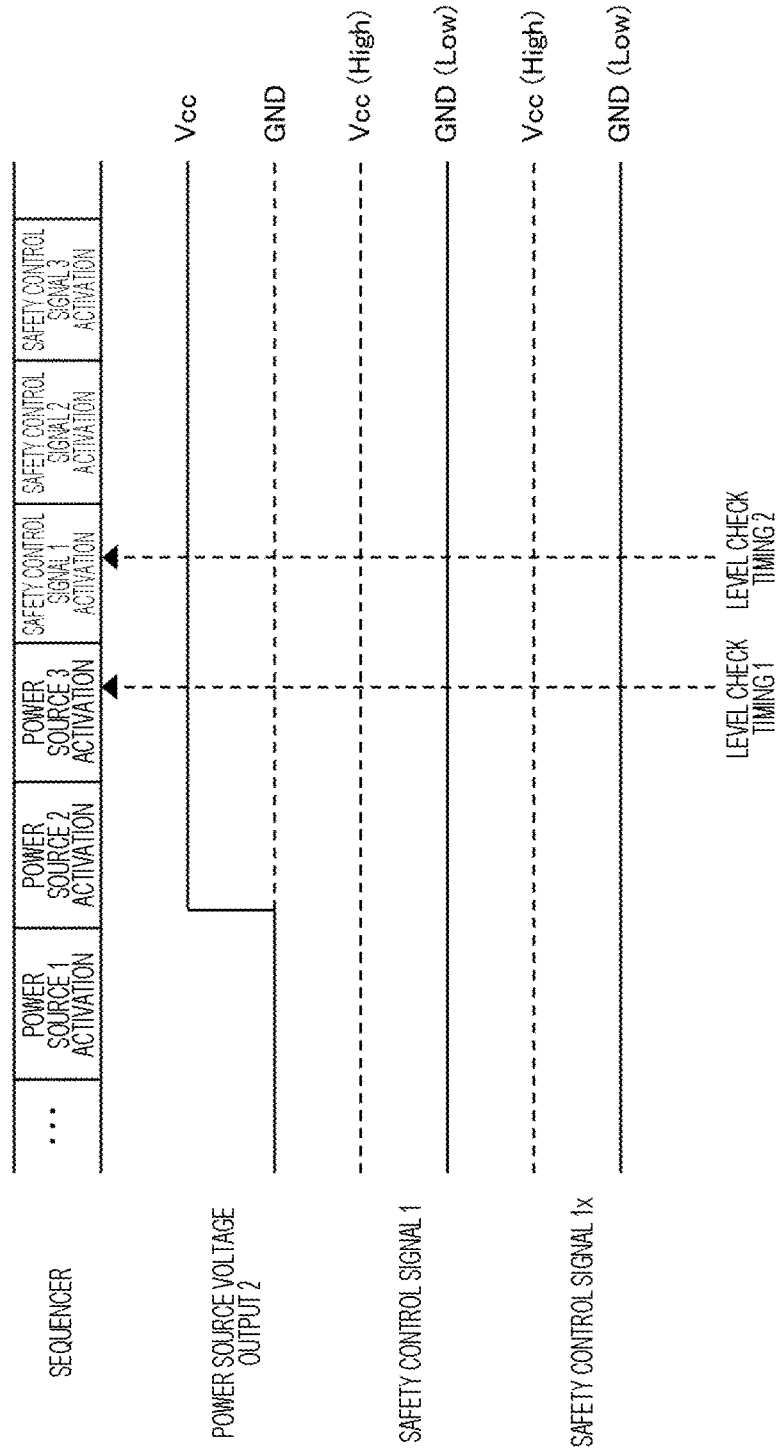
FIG. 5 is a timing chart of the safety control signal in the electronic control device illustrated in FIG. 1. (in a Low fixation abnormal state)

FIG. 5 is a timing chart illustrating an operation example when the control signal output from the power source IC 3 is in a Low fixation abnormal state. Here, it is assumed that the level of the safety control signal is defined similarly to FIG. 3, and the same applies to the timing of the level check of the signal.

According to the internal state of the power source IC 3, the power source voltage output 2 is activated in the state of activation of the power source 2. Then, in the state of the activation of the safety control signal 1, the safety control signal 1 and the safety control signal 1x are activated. However, when GND (Low level), and the safety control signal 1 or the safety control signal 1x are fixed, the safety control signal 1/the safety control signal 1x operates similarly to GND.

Therefore, the safety control signal 1/safety control signal 1x is at the level of GND even after the activation timing. That is, when Low fixation abnormality occurs in the safety control signal, the diagnosis circuit 14 determines the determination result to have a Low fixation abnormality under the condition that both the signal levels before and after activation are GND (Low level).

Example 1 of Fixation Abnormality Determination Between Safety Control Signals

Figure 6:
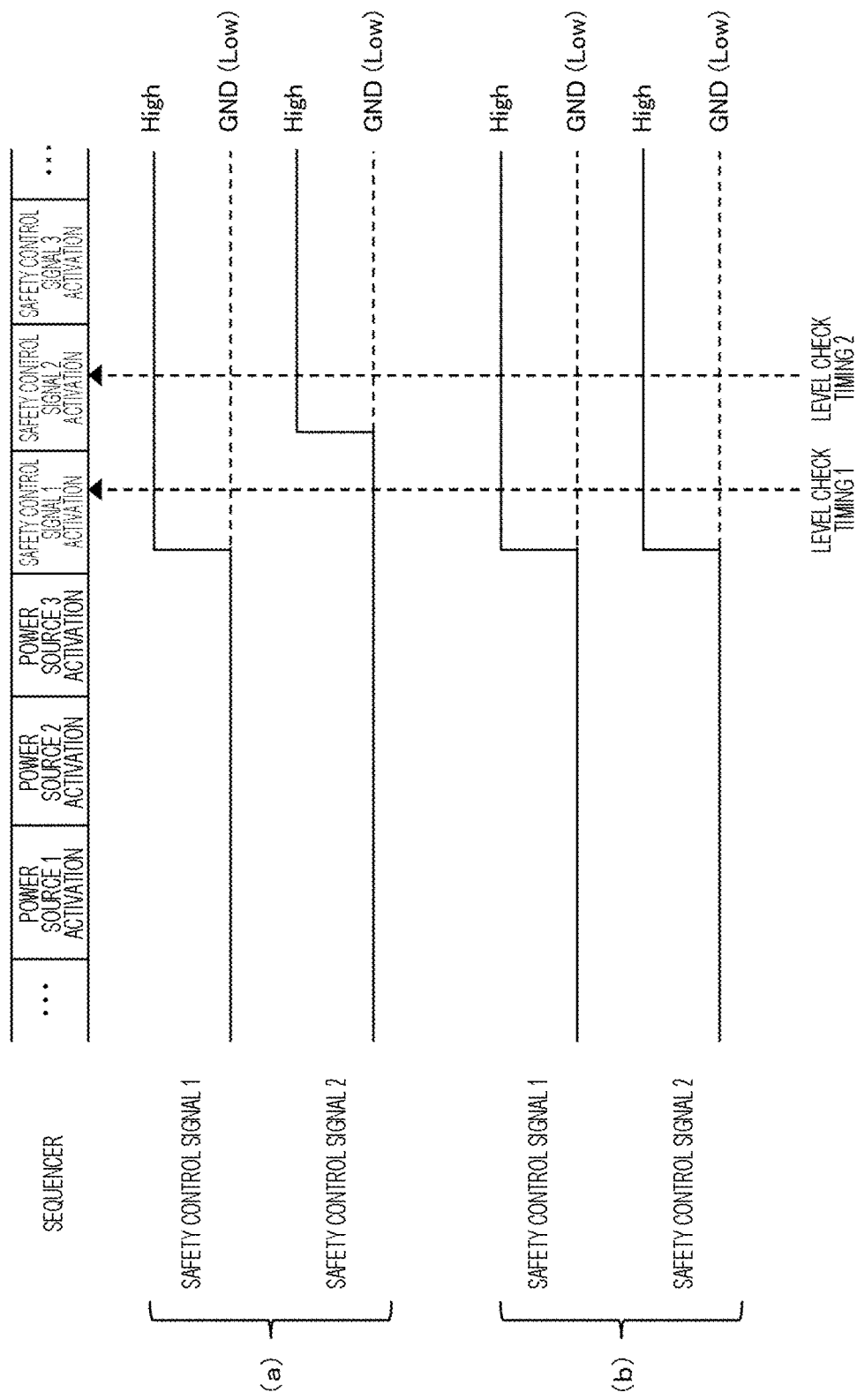
FIG. 6 is a timing chart of an operation example of fixation diagnosis of safety control signals in the electronic control device illustrated in FIG. 1.

FIG. 6 is a timing chart illustrating an operation example of fixation diagnosis of the safety control signals output from the power source IC 3. Here, a case where the fixation diagnosis of the safety control signal 1 and the safety control signal 2 is performed will be described.

(a) of the drawing illustrates an operation example in a normal state. According to the sequencer (16), the safety control signal 1 is activated in the state of activation of the safety control signal 1, and the safety control signal 2 is activated in the state of activation of the safety control signal 2. By checking signal levels before and after activation of the safety control signal 2 to be activated later, fixation with the safety control signal 1 is checked. That is, the signal level before the activation is checked at a level check timing 1 that is in the state of activation of the safety control signal 1, and the signal level after the activation is checked at a level check timing 2 that is in the state of activation of the safety control signal 2.

The signal level before activation of the safety control signal 2 is GND (Low level)/the signal level after activation is Vcc (High level), and the levels before and after activation are different, so that the diagnosis circuit 14 determines that no abnormality occurs.

(b) of the drawing illustrates an operation example in an abnormal state, and illustrates an operation when the safety control signal 1 and the safety control signal 2 are fixed. In this case, the safety control signal 2 operates similarly to the safety control signal 1, and transitions to Vcc (High level) at the timing at which the safety control signal 1 is activated. (a) Similarly to the normal state, when the signal level is checked at the level check timing ½ before and after the original activation timing of the safety control signal 2, both the signal levels before and after the activation are Vcc (High level), and the levels before and after the activation are the same, so that the diagnosis circuit 14 determines that the fixation abnormality has occurred in the safety control signal.

Example 2 of Fixation Abnormality Determination Between Safety Control Signals

Figure 7:
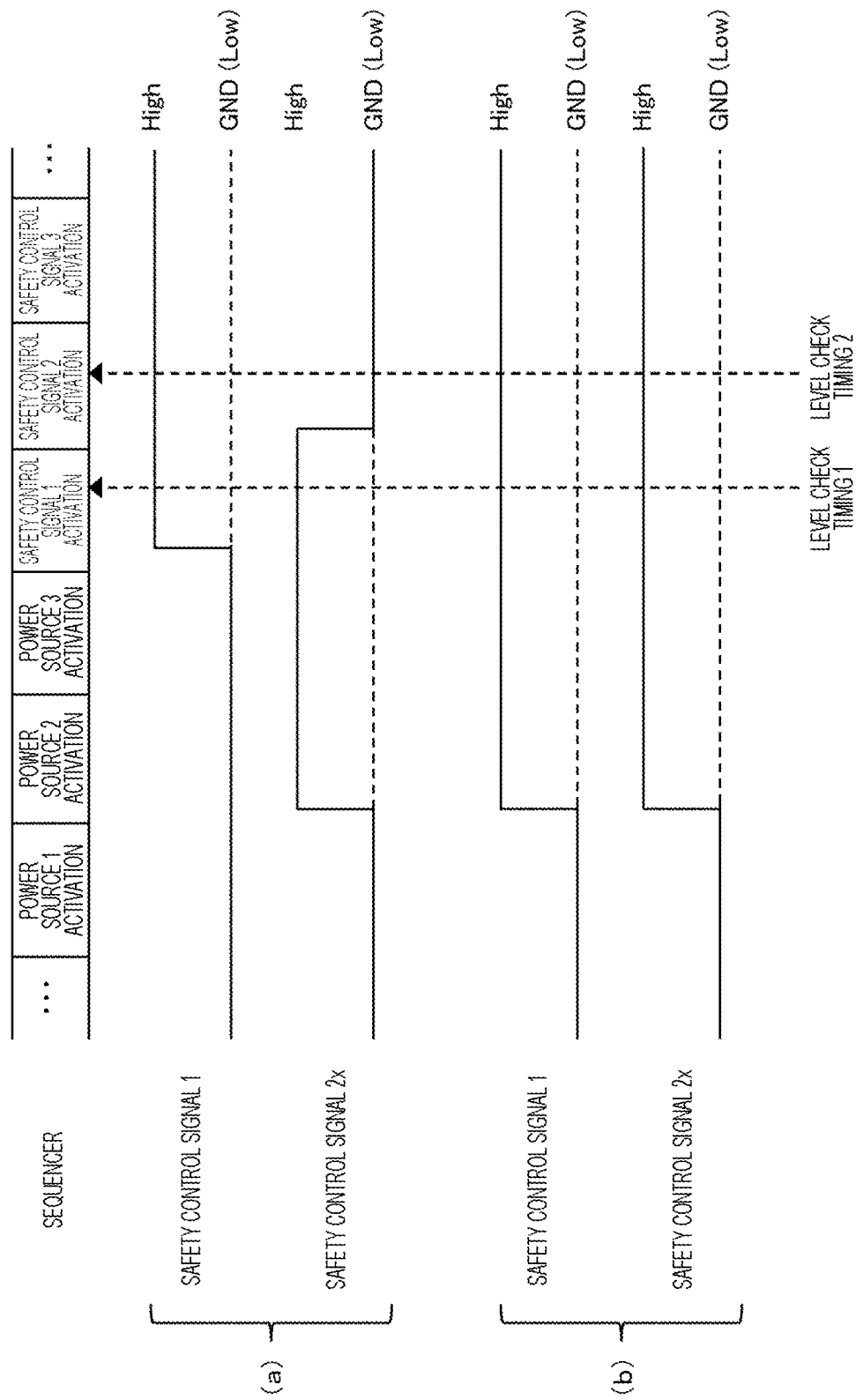
FIG. 7 is a timing chart illustrating an operation example of fixation diagnosis of the safety control signals in the electronic control device illustrated in FIG. 1.

FIG. 7 is a timing chart illustrating another operation example of fixation diagnosis of the safety control signals output from the power source IC 3. Here, a case where the fixation diagnosis of the safety control signal 1 and the safety control signal 2x is performed will be described. The safety control signal 2x is a negative logic signal.

(a) of the drawing illustrates an operation example in a normal state. According to the sequencer (16), the safety control signal 1 is activated in the state of activation of the safety control signal 1, and the safety control signal 2x is activated in the state of activation of the safety control signal 2. The safety control signal 2x transitions to Vcc (High level), which is an initial state, at the timing when the power source voltage output 2 is activated. Similarly to FIG. 6, the signal level before the activation is checked at a level check timing 1 that is the timing before and after activation of the safety control signal 2x to be activated later, and the signal level after the activation is checked at the level check timing 2 that is in the state of activation of the safety control signal 2.

The signal level before activation of the safety control signal 2 is Vcc (High level)/the signal level after activation is GND (Low level), and the levels before and after activation are different, so that the diagnosis circuit 14 diagnoses that the output of the safety control signal is normal.

(b) of the drawing illustrates an operation example in an abnormal state, and illustrates an operation when the safety control signal 1 and the safety control signal 2x are fixed. In this case, the safety control signal 1 and the safety control signal 2x operate similarly. (a) Similarly to the normal state, when the signal level is checked at the level check timing ½ before and after the original activation timing of the safety control signal 2, both the signal levels before and after the activation are Vcc (High level), and the levels before and after the activation are the same, so that the diagnosis circuit 14 determines that the fixation abnormality has occurred in the safety control signal.

It is possible to diagnose whether or not a short circuit has occurred in the internal power source of the power source IC 3 and the safety control signal by diagnosing whether or not various safety control signals have a fixation failure before the safety control signal rises. In addition, it is possible to diagnose whether or not a short circuit has occurred between the safety control signal 1 and the safety control signal 1x as illustrated in FIG. 3 by diagnosing whether or not various safety control signals have a fixation failure after the safety control signal rises.

As described above, the electronic control device 1 in the present embodiment includes the microcomputer 2 and the power source IC 3 that communicates with the microcomputer 2. The power source IC 3 includes the monitoring circuit 18 that monitors the microcomputer 2, the safety processing circuit 13 that outputs the safety control signal when the monitoring circuit 18 determines the occurrence of an abnormality in the microcomputer, and the diagnosis circuit 14 that diagnoses whether or not the safety control signal has a fixation failure. The diagnosis circuit 14 detects whether or not the fixation failure has occurred, based on states of the safety control signal before and after the safety control signal is activated after activation of the power source.

In addition, the diagnosis circuit 14 detects the state of the safety control signal in a period after the power source is activated and before the safety control signal is activated, detects the state of the safety control signal in a period after the safety control signal is activated, and compares the states before and after the activation of the safety control signal, thereby diagnosing whether or not the safety control signal has the fixation failure.

The diagnosis circuit 14 completes the diagnosis of the safety control signal by the diagnosis circuit 14 before the microcomputer 2 is activated.

Then, the power source IC 3 controls the safety control signal in which the fixation failure is not detected, and transitions the system being the control target of the electronic control device 1 to a safe state.

According to the present embodiment, it is possible to perform the fixation diagnosis of the safety control signal of the power source IC 3 before the microcomputer 2 is activated, and to safely control the electronic control device 1 and the system being the control target of the electronic control device 1.

Second Embodiment

Example of Electronic Control Device for Engine

An electronic control device and control thereof according to a second embodiment of the present invention will be described with reference to FIG. 8.

The present embodiment is an example of an engine electronic control device in which the electronic control device of the first embodiment is applied to engine control. FIG. 8 is a block diagram illustrating an internal configuration of an engine electronic control device according to the present embodiment.

Figure 8:
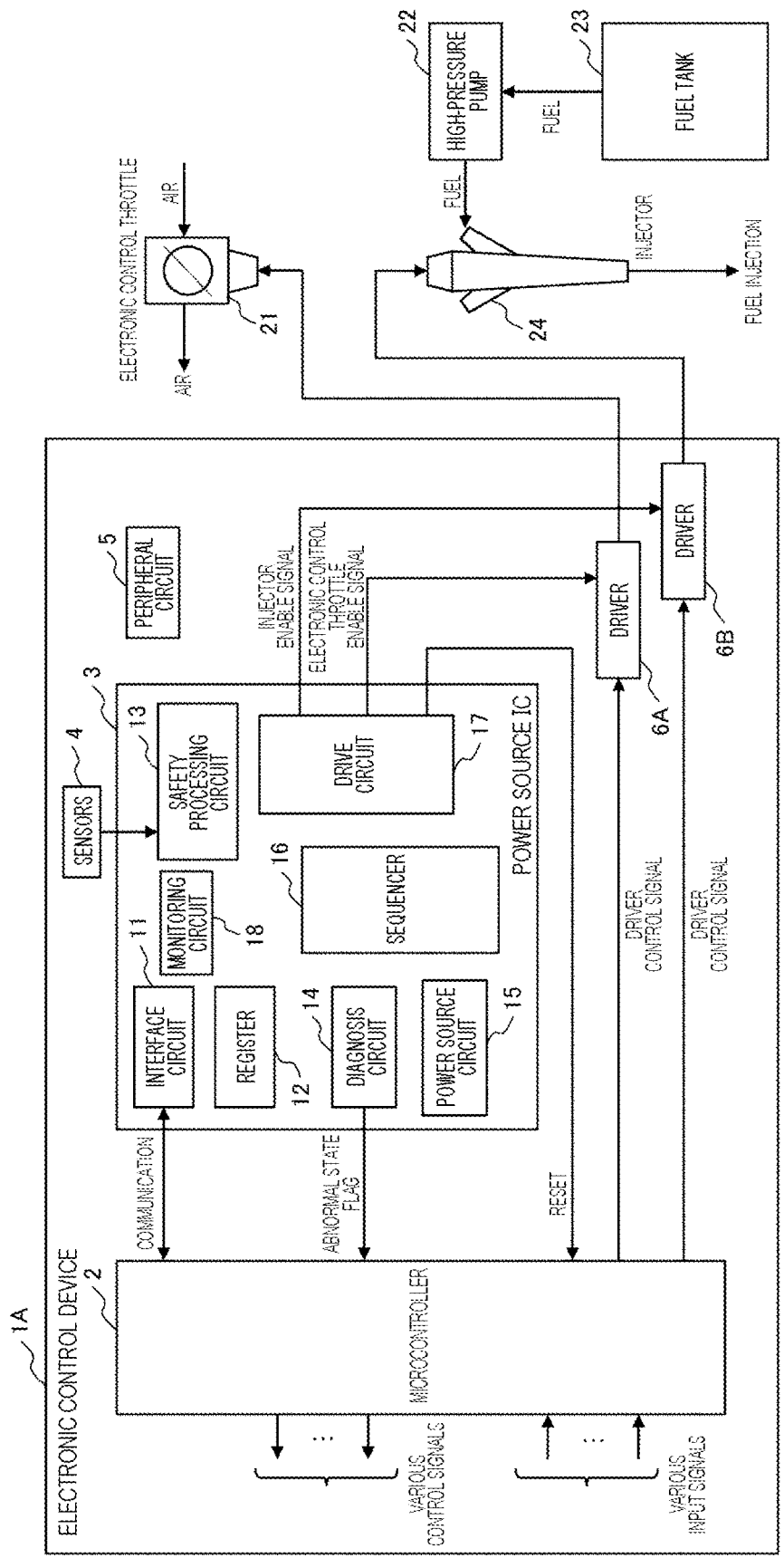
FIG. 8 is a block diagram illustrating an internal configuration of an engine electronic control device according to a second embodiment of the present invention.

As illustrated in FIG. 8, an electronic control device 1A in the present embodiment includes drivers 6A and 6B for driving an electronic control throttle 21 and an injector 24, respectively, in addition to the configuration of the electronic control device 1 in the first embodiment (FIG. 1). The drivers 6A and 6B are controlled by a driver control signal from the microcomputer 2.

The drive circuit 17 outputs a reset signal, an electronic control throttle enable signal, and an injector enable signal, as the safety control signals. The reset signal is used to reset the microcomputer 2. The electronic control throttle enable signal is input to the driver 6A, and switches enabling/disabling of the control of the electronic control throttle 21 by the microcomputer 2. The injector enable signal is input to the driver 6B, and switches enabling/disabling of the control of the injector 24 by the microcomputer 2.

The electronic control throttle 21 is a valve that electronically controls the amount of intake air flowing into an engine and adjusts the output of the engine. The electronic control throttle 21 adjusts the amount of air taken in from the outside and sends the air toward the engine.

The injector 24 is used to atomize and pump fuel into a cylinder of the engine. The fuel supplied from the fuel tank 23 is pressurized by a high-pressure pump 22 and injected in an atomized state by passing through the injector 24.

When an abnormality has occurred in the electronic control device 1A, the electronic control throttle enable signal can be used to stop the electronic control throttle 21 so as to block the air supplied to the engine, or the injector enable signal can be used to stop the injector 24 so as to block the fuel supplied to the engine. Further, by resetting the microcomputer 2 using the reset signal, the electronic control throttle 21 and the injector 24 can be controlled and safely stopped.

As described in the first embodiment (FIG. 3), the electronic control throttle enable signal and the injector enable signal are set to be active by raising the enable signal (safety control signal) one by one after all the internal power sources of the power source IC 3 are activated.

In addition, if the reset signal output from the drive circuit 17 is activated last with respect to other safety control signals, it is possible to perform abnormality diagnosis of all the safety control signals before the system is activated.

Third Embodiment

Example of Electronic Control Device for Electric Vehicle

An electronic control device and control thereof according to a third embodiment of the present invention will be described with reference to FIG. 9.

The present embodiment is an example of an inverter electronic control device in which the electronic control device in the first embodiment is applied to motor control of an electric vehicle. FIG. 9 is a block diagram illustrating an internal configuration of an inverter electronic control device according to the present embodiment.

Figure 9:
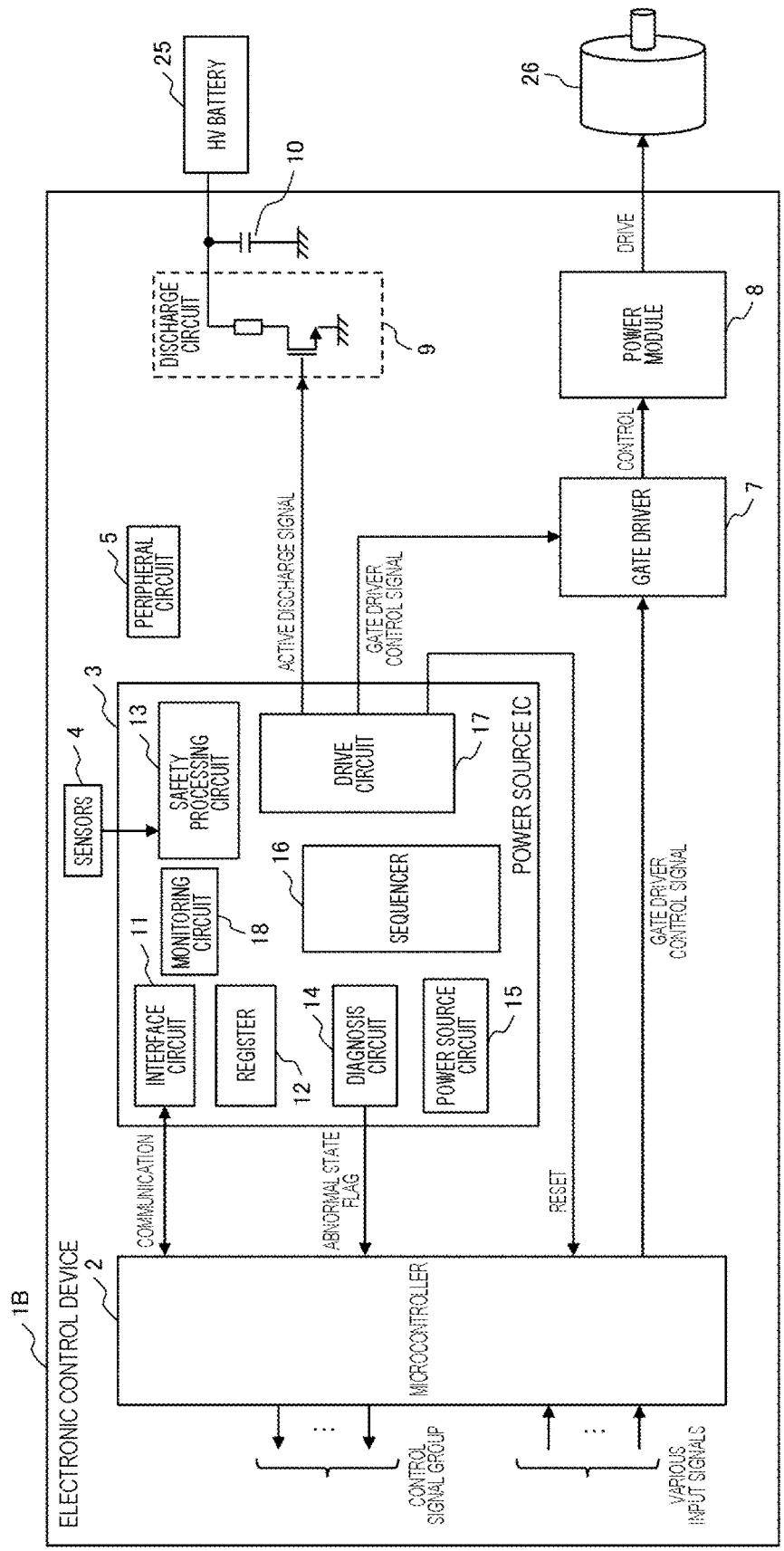
FIG. 9 is a block diagram illustrating an internal configuration of an inverter electronic control device according to a third embodiment of the present invention.

As illustrated in FIG. 9, an electronic control device 1B in the present embodiment includes, in addition to the configuration of the electronic control device 1 in the first embodiment (FIG. 1), a power module 8 for driving a motor 26, a gate driver 7 for controlling the power module 8, a capacitor 10 that stores electric charges from an HV (high voltage) battery 25, and a discharge circuit 9 for discharging the electric charge stored in the capacitor 10.

The drive circuit 17 outputs a reset signal, a gate driver control signal, and an active discharge signal as the safety control signals. The reset signal is used to reset the microcomputer 2.

Although the main configuration of the electronic control device 1B is omitted in FIG. 9 for easy understanding, the motor that is generally used in the electric vehicle is a three-phase AC motor, and three types of drive signals are required. Therefore, three power modules 8 are actually required. In addition, two transistors are mounted on one power module, and in order to control the three power modules, six gate drivers are used and control is performed by six control signals.

When an abnormality has occurred in the electronic control device 1B, the gate driver 7 is controlled by the gate driver control signal output from the drive circuit 17. The motor 26 is safely stopped by controlling the power module 8. The discharge circuit 9 is controlled by controlling the active discharge signal, and the electric charges stored in the capacitor 10 from the HV battery 25 are safely discharged. In addition, by resetting the microcomputer 2 using the reset signal, it is possible to safely stop the system to which the electronic control device 1B is applied.

In addition, if the reset signal output from the drive circuit 17 is activated last with respect to other safety control signals, it is possible to perform abnormality diagnosis of all the safety control signals before the system is activated.

Fourth Embodiment

Processing Flow When System is Activated

Figure 10:
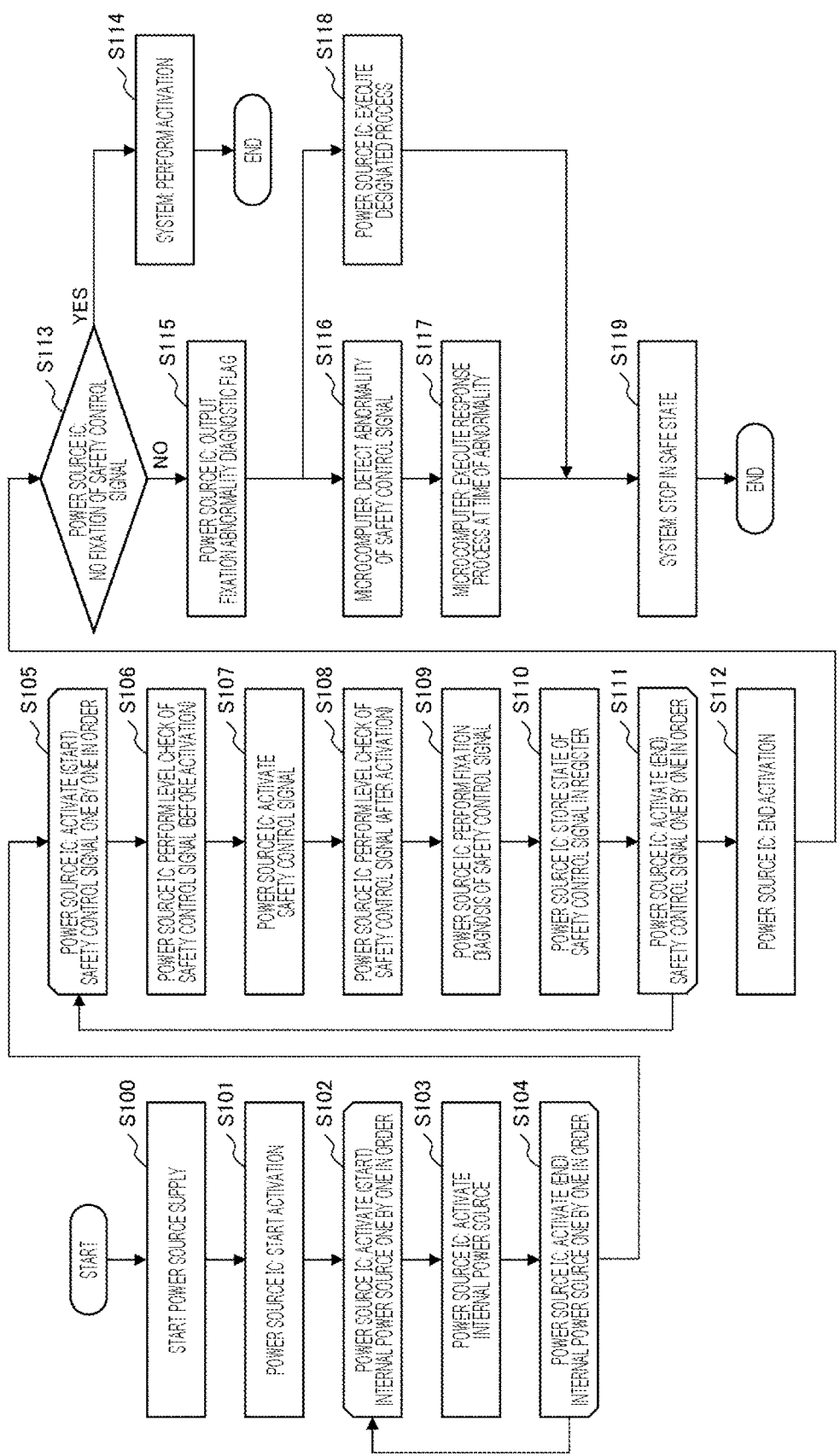
FIG. 10 is a flowchart of a method for diagnosing an electronic control device according to a fourth embodiment of the present invention.

A representative control method (diagnosis method) of the electronic control device of the present invention will be described with reference to FIG. 10. FIG. 10 is a flowchart illustrating a processing operation example until activation is performed in a system to which the electronic control device 1 in the first embodiment (FIG. 1) is applied.

When power is supplied to the electronic control device 1 (Step S100), the power source IC 3 starts activation (Step S101). When starting activation, the power source IC 3 starts activation of the generated internal power sources in order (Step S102). When the activation of one internal power source is completed (Step S103), the remaining internal power sources are also activated in order. When the activation of all the internal power sources is completed (Step S104), the safety control signal is activated. When the activation of all the internal power sources has not ended in Step S104, the process returns to Step S102, and each internal power source is activated in order.

The safety control signals output from the power source IC 3 also start to be activated one by one in order (Step S105). The level check of the safety control signal is first performed before activation (Step S106). When the activation of the safety control signal is completed (Step S107), the level check of the safety control signal after activation is performed (Step S108). Then, fixation diagnosis of the safety control signal is performed by using the result of the level check performed before and after activation (Step S109), and the state of the safety control signal for which diagnosis has been performed is stored in the register 12 regardless of the diagnostic result (Step S110). The processing up to this step is performed on each safety control signal, and the activation of the safety control signal is ended (Step S111). Then, the activation of the power source IC 3 is ended (Step S112). When the activation of all the safety control signals is not ended in Step S111, the process returns to Step S105, and the safety control signals are activated in order.

Here, the power source IC 3 checks whether there is no fixation abnormality in the safety control signal (Step S113). When there is no fixation abnormality (YES), the process transitions to activation of the system (Step S114). On the other hand, when there is the fixation abnormality (NO), the fixation abnormality diagnosis flag signal is output to the microcomputer 2 (Step S115), and microcomputer 2 is notified of the abnormality. The microcomputer 2 detects an abnormality in the safety control signal by the register information and the fixation abnormality diagnosis flag signal stored in Step S110 (Step S116). The microcomputer 2 executes a response process in the abnormal state (Step S117), and controls to stop the system in a safe state (Step S119).

In addition, after outputting the fixation abnormality diagnosis flag signal, the power source IC 3 performs an operation set (designated) in advance by the register 12 or the like (Step S118), and can perform control to stop the system in a safe state (Step S119). As the preset operation, for example, there are a plurality of possibilities of performing nothing, stopping the voltage output output to the outside, outputting the safety control signal to safely stop the system, and the like.

The safety control signal in the present embodiment includes at least one of the reset signal to the microcomputer 2, the enable signal to the injector 24, the enable signal to the electronic control throttle 21, the control signal of the gate driver (IC) 7, and the signal related to active discharge, which have been described in the first to third embodiments.

In the above-described embodiments, control lines and information lines considered necessary for the descriptions are illustrated, and not all the control lines and the information lines in the product are necessarily shown.

Furthermore, in each of the above-described embodiments, the configuration of the functional block is merely an example. Some functional configurations illustrated as separate functional blocks may be integrally configured, or a configuration illustrated in one functional block diagram may be divided into two or more functions. In addition, some of the functions in each functional block may be included in another functional block.

In addition, the above-described embodiments may be combined. Although various embodiments have been described above, the present invention is not limited to these contents. Other forms considered within the scope of the technical idea of the present invention are also included in the scope of the present invention.

Reference Signs List 1, 1A, 1B electronic control device
2 microcomputer (microcontroller)
3 power source IC
4 sensors
5 peripheral circuit
6A, 6B driver
7 gate driver (IC)
8 power module
9 discharge circuit
10 capacitor
11 interface circuit
12 register
13 safety processing circuit
14 diagnosis circuit
15 power source circuit
16 sequencer
17 drive circuit
18 monitoring circuit
20 diagnostic information register
21 electronic control throttle
22 high-pressure pump
23 fuel tank
24 injector
25 HV (high voltage) battery
26 motor

The invention claimed is:

1. An electronic control device comprising:
a microcomputer; and
a power source IC that communicates with the microcomputer,
wherein the power source IC includes
a monitoring circuit that monitors the microcomputer,
a safety processing circuit that outputs a safety control signal when the monitoring circuit determines an occurrence of an abnormality in the microcomputer, and
a diagnosis circuit that diagnoses whether or not the safety control signal has a fixation failure, and
the diagnosis circuit detects whether or not the fixation failure has occurred, by comparing states of the safety control signal before and after the safety control signal is activated after activation of a power source.

2. The electronic control device according to claim 1, wherein the safety control signal includes at least one of a reset signal to the microcomputer, an enable signal to an injector, an enable signal to an electronic control throttle, a control signal of a gate driver IC, and a signal related to active discharge.

3. The electronic control device according to claim 1, wherein the diagnosis circuit
detects a state of the safety control signal in a period from activation of the power source to activation of the safety control signal,
detects the state of the safety control signal in a period after the activation of the safety control signal, and
diagnoses whether or not the safety control signal has a fixation failure by comparing the states before and after the activation of the safety control signal.

4. The electronic control device according to claim 1, wherein the power source IC includes a register that stores a diagnostic result of the diagnosis circuit.

5. The electronic control device according to claim 1, wherein, when the diagnosis circuit detects a fixation failure of the safety control signal, the power source IC outputs an abnormal state flag signal to the microcomputer and does not activate the microcomputer.

6. The electronic control device according to claim 5, wherein the power source IC does not activate the microcomputer by stopping a power source voltage supplied to the microcomputer.

7. The electronic control device according to claim 1, wherein the diagnosis circuit completes diagnosis of the safety control signal by the diagnosis circuit before the microcomputer is activated.

8. The electronic control device according to claim 1, wherein the power source IC controls the safety control signal in which no fixation failure is detected, and transitions a system being a control target of the electronic control device to a safe state.

9. A method for diagnosing an electronic control device including a microcomputer and a power source IC that communicates with the microcomputer, the method comprising: by the power source IC,
activating internal power sources one by one before the microcomputer is activated;
after all the internal power sources are activated, activating safety control signals one by one; and
detecting whether or not a fixation failure has occurred in the safety control signals by comparing states of the safety control signals before and after the safety control signal corresponding to the internal power source is activated after activation of a predetermined internal power source.

10. The method for diagnosing an electronic control device according to claim 9, wherein the safety control signal includes at least one of a reset signal to the microcomputer, an enable signal to an injector, an enable signal to an electronic control throttle, a control signal of a gate driver IC, and a signal related to active discharge.

11. The method for diagnosing an electronic control device according to claim 9, further comprising:
detecting a state of the safety control signal in a period from activation of the internal power source to activation of the safety control signal corresponding to the internal power source;
detecting a state of the safety control signal in a period after the safety control signal is activated; and
diagnosing whether or not the safety control signal has a fixation failure by comparing the states before and after the activation of the safety control signal.

12. The method for diagnosing an electronic control device according to claim 9, further comprising
storing a diagnostic result of the safety control signal in a register of the power source IC.

13. The method for diagnosing an electronic control device according to claim 9, further comprising when a fixation failure of the safety control signal is detected, outputting an abnormal state flag signal to the microcomputer, and not activating the microcomputer.

14. The method for diagnosing an electronic control device according to claim 13, wherein the microcomputer is not activated by stopping a power source voltage supplied to the microcomputer.

15. The method for diagnosing an electronic control device according to claim 9, further comprising
completing diagnosis of the safety control signal before the microcomputer is activated.

* * * * *